(No Model.)

F. W. JUDD.
HANDLE FOR KITCHEN UTENSILS.

No. 429,453. Patented June 3, 1890.

WITNESSES.
Frank Miller.
N. J. Bainbridge

INVENTOR.
Fred W. Judd
by Watson & Thurston
Attorneys

UNITED STATES PATENT OFFICE.

FRED W. JUDD, OF CLEVELAND, OHIO.

HANDLE FOR KITCHEN UTENSILS.

SPECIFICATION forming part of Letters Patent No. 429,453, dated June 3, 1890.

Application filed August 26, 1889. Serial No. 321,938. (No model.)

*To all whom it may concern:*

Be it known that I, FRED W. JUDD, a citizen of the United States, residing at Cleveland, in the county of Cuyahoga and State of Ohio, have invented certain new and useful Improvements in Handles for Kitchen Utensils, &c., of which the following is a full, clear, and exact description, reference being had to the accompanying drawings, in which—

Figure 1:
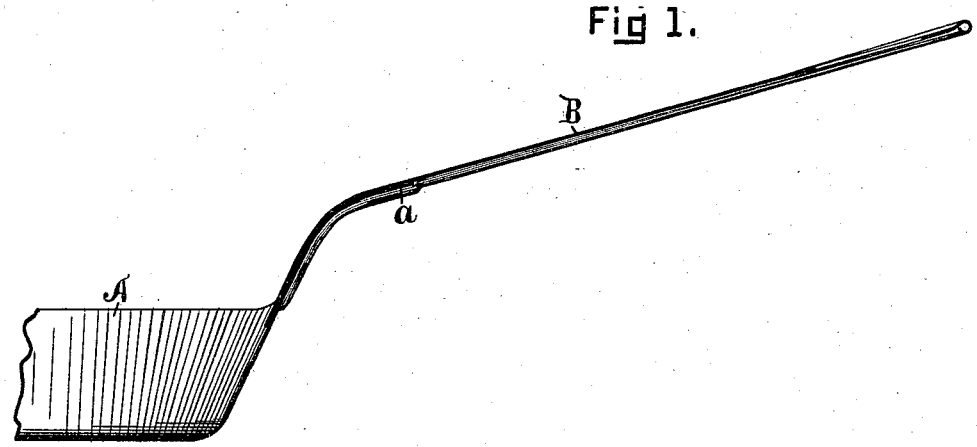
Figure 2:
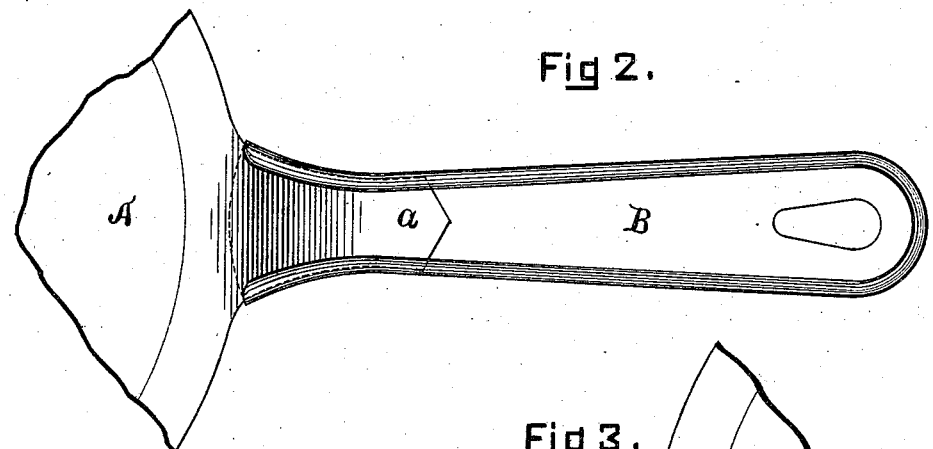
Figure 3:
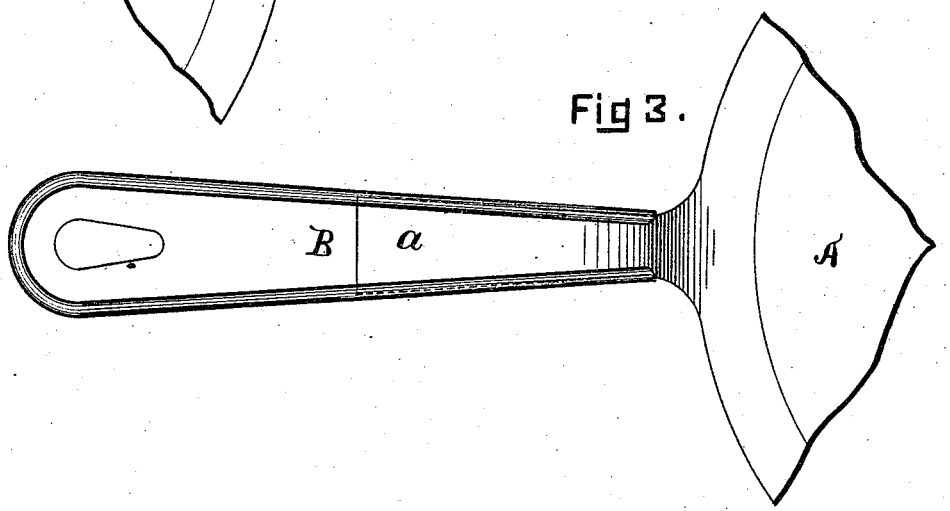

Figure 1 is a central vertical section of a utensil provided with my improved handle. Fig. 2 is a bottom view of said utensil and handle, and Fig. 3 is a bottom view of a modified form thereof.

My invention is of especial advantage when applied to the various kinds of utensils and vessels which are stamped from sheet metal; and the object is to provide a handle for such utensil which is itself cheap and which renders the completed utensil cheap by reason of the easy manner in which said handle is permanently secured to said utensil.

Referring to the drawings, A represents a skillet, which is one of that class of utensils in which I believe my invention to be an improvement. These utensils are stamped from a piece of metal which is substantially square before it is manipulated. One of the corners of this piece may therefore, without additional expense for stock, be left attached in the form of a tongue *a*. This tongue is curved transversely at an angle to the vessel into any shape, except the arc of a circle, throughout its length. In the precise form shown the outer end of this tongue is left substantially straight, while between this straight part and the point of union with the vessel the tongue is bent in any desired form and direction.

B represents the handle, which is a single thickness of metal, having its inner end bent in like shape to the tongue, so that when placed together the tongue and handle will lie close against each other. The longitudinal edges of the handle are then turned over and the edges of that part of the handle which is contiguous to the tongue are pressed against said tongue, whereby the two are firmly held together. The turned-over edges prevent the removal of the handle by any force except an end pull, and a removal by pulling endwise upon the handle is impossible, because the tongue and handle are not curved in the arc of a circle in their contiguous parts. A somewhat greater security against displacement by an end pull is secured by making the tongue of a shape which gradually widens toward its outer end, as shown in the drawings, although this construction is not essential.

I am aware of the Patents No. 200,033, granted February 5, 1878, to Edgar and Bardell, and No. 204,319, granted May 28, 1878, to F. Grosjean; but I do not intend to claim any invention shown therein, but What I do claim is—

1. The combination of a utensil having a short integral tongue curved substantially as described, with a sheet-metal handle similarly curved in its contiguous parts and having its longitudinal edges rolled back against said tongue, substantially as and for the purpose specified.

2. The combination of a utensil having a short integral stem which grows broader toward its outer end and which is curved substantially as described, with a handle similarly curved in its contiguous parts and having its sides rolled back closely against said tongue, substantially as and for the purpose specified.

FRED W. JUDD.

Witnesses:
WILL J. BAINBRIDGE,
LEONARD WATSON.